(12) United States Patent
Kim

(10) Patent No.: US 11,785,361 B2
(45) Date of Patent: Oct. 10, 2023

(54) IMAGE SENSING DEVICE INCLUDING FLOATING DIFFUSION NODE WITH CONTROLLABLE CAPACITANCE AND OPERATION METHOD THEREOF

(71) Applicant: SK hynix Inc., Icheon-si (KR)

(72) Inventor: Sie Uoo Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/536,741

(22) Filed: Nov. 29, 2021

(65) Prior Publication Data

US 2023/0028521 A1 Jan. 26, 2023

(30) Foreign Application Priority Data

Jul. 20, 2021 (KR) .......................... 10-2021-0094944

(51) Int. Cl.
| | |
|---|---|
| *H04N 25/77* | (2023.01) |
| *H04N 25/50* | (2023.01) |
| *H04N 25/57* | (2023.01) |
| *H04N 25/58* | (2023.01) |
| *H04N 25/766* | (2023.01) |

(52) U.S. Cl.
CPC ............. *H04N 25/77* (2023.01); *H04N 25/50* (2023.01)

(58) Field of Classification Search
CPC ...... H04N 5/3745; H04N 5/351; H04N 5/378; H04N 5/3559; H04N 5/37455; H04N 5/37452; H04N 25/50; H04N 25/77; H04N 25/57; H04N 25/58; H04N 25/766
See application file for complete search history.

(56) References Cited

U.S. PATENT DOCUMENTS

| | | | |
|---|---|---|---|
| 9,247,170 B2 | 1/2016 | Komori et al. | |
| 11,637,979 B2 * | 4/2023 | Lee ........................ | H04N 25/75 |
| 2019/0199951 A1* | 6/2019 | Kwag .................. | H04N 25/709 |
| 2021/0029316 A1* | 1/2021 | Lee ....................... | H04N 5/3698 |
| 2021/0297611 A1* | 9/2021 | Hwang .................. | H04N 25/77 |

\* cited by examiner

*Primary Examiner* — Marly S Camargo
(74) *Attorney, Agent, or Firm* — Perkins Coie LLP

(57) ABSTRACT

An image sensing device may include a pixel circuit and a driving control circuit. The pixel circuit is configured to store photocharge, generated by a photoelectric conversion element, as image information. The driving control circuit may control the pixel circuit to adjust the signal conversion gain ratio depending on the illuminance of the incident light at the image sensing device.

19 Claims, 7 Drawing Sheets

FIG. 4
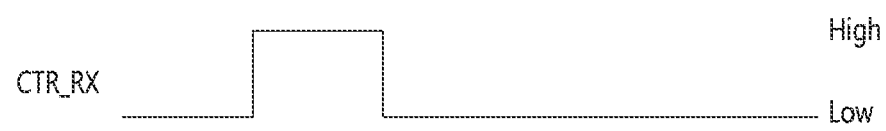

IMAGE SENSING DEVICE INCLUDING FLOATING DIFFUSION NODE WITH CONTROLLABLE CAPACITANCE AND OPERATION METHOD THEREOF

CROSS-REFERENCES TO RELATED APPLICATION

This patent document claims the priority and benefits of Korean application number 10-2021-0094944, filed on Jul. 20, 2021, which is incorporated herein by reference in its entirety as part of the disclosure of this patent document.

TECHNICAL FIELD

The technology and implementations disclosed in this patent document generally relate to an image sensing device and an operation method thereof, and more particularly to an image sensing device that can process image data by adjusting a conversion gain ratio, and an operation method thereof.

BACKGROUND

An image sensing device is used in electronic devices to convert optical images into digital electrical signals. With the recent development of automotive, medical, computer and communication industries, the demand for high-performance image sensors has been increasing in various electronic devices such as a smart phone, digital camera, camcorder, personal communication system (PSC), game machine, security camera, medical micro camera, robot industry and infrared sensing device.

One common type of image sensing devices is a charge coupled device (CCD), which has dominated the field of image sensors for a long time. Another common type of image sensing device is a complementary metal oxide semiconductor (CMOS) image sensing device.

CMOS image sensing devices are fabricated using the CMOS fabrication technology, and thus CMOS image sensors and other signal processing circuitry can be integrated into a single chip, enabling the production of miniaturized CMOS image sensing devices, low power consumption image sensors at a lower cost.

SUMMARY

In an embodiment, an image sensing device comprising: a pixel circuit configured to transmit photocharge, generated by a photoelectric conversion element, to a floating diffusion node and store image information; and a driving control circuit configured to generate a reset control signal and a transmission control signal, which are used to control a row operation of the pixel circuit, and generate a plurality of selection control signals to control a column operation of the pixel circuit, wherein the pixel circuit controls the capacitance value of the floating diffusion node based on the plurality of selection control signals.

In an embodiment, an operation method of an image sensing device, comprising: resetting a floating diffusion node included in a pixel circuit of the image sensing device, wherein the image sensing device includes a photoelectric conversion element to detect incident light to generate photocharge carrying an image in the incident light, and the floating diffusion node holds the photocharge generated by the photoelectric conversion element; transmitting, to the floating diffusion node, the photocharge, generated by the photoelectric conversion element; selectively activating at least one of a plurality of selection transistors structured to adjust a capacitance value of the floating diffusion node; and generating an output voltage based on a voltage of the floating diffusion node adjusted based on the capacitance value of the floating diffusion node.

In an embodiment, an operation method of an image sensing device may include: performing a reset operation of resetting a floating diffusion node included in a pixel circuit and a transmission operation of transmitting photocharge, generated by a photoelectric conversion element, to the floating diffusion node; performing a capacitance control operation and a select output operation on the floating diffusion node; and performing a driving operation of generating an output voltage through a driving operation, based on the voltage of the floating diffusion node.

In an embodiment, an image sensing device comprising: a photoelectric conversion element structured to detect incident light to generate photocharge carrying an image in the incident light; a pixel circuit coupled to the photoelectric conversion element and including: a floating diffusion node coupled to the photoelectric conversion element and structured to receive and hold the photocharge generated by the photoelectric conversion element; and a driving transistor coupled to receive a signal representing the photocharge in the floating diffusion node and structured to generate an output voltage corresponding to a voltage level of the floating diffusion node representing the photocharge in the floating diffusion node; and a driving control circuit coupled to the pixel circuit and configured to generate to generate a plurality of control signals to control the pixel circuit, including a reset control signal for resetting the floating diffusion node and a transmission control signal for controlling transmission of the photocharge from the photoelectric conversion element to the floating diffusion node, wherein the pixel circuit is structured to respond to one or more other control signals in the control signals from the driving control circuit to adjust a capacitance value of the floating diffusion node.

In some implementations, the row operation comprises a reset operation and a transmission operation of the pixel circuit, and the column operation comprises a capacitance control operation, a select output operation and a driving operation of the pixel circuit.

In some implementations, the driving control circuit selectively activates the plurality of selection control signals based on of driving information and illuminance information during the column operation when the driving transistor generates the output voltage.

In some implementations, the pixel circuit includes a reset transistor configured to reset the floating diffusion node on the basis of the reset control signal, a transmission transistor configured to transmit the photocharge, generated by the photoelectric conversion element, to the floating diffusion node on the basis of the transmission control signal, a control circuit configured to control the capacitance value of the floating diffusion node on the basis of the plurality of selection control signals, and a driving transistor configured to generate an output voltage corresponding to the voltage level of the floating diffusion node.

In some implementations, the plurality of selection control signals includes a first selection control signal and a second selection control signal. The control circuit includes a first selection transistor configured to adjust the capacitance value to a first capacitance value based on the first selection control signal, and a second selection transistor configured to adjust the capacitance value to a second capacitance value based on the second selection control signal.

In some implementations, the first and second selection transistors are coupled to the floating diffusion node in parallel.

In some implementations, at least one of a channel length, a channel width, a thickness of a gate dielectric layer, an impurity doping concentration of a channel region of the first selection transistor is different from a corresponding one of a channel length, a channel width, a thickness of a gate dielectric layer, an impurity doping concentration of a channel region of the second selection transistor.

In some implementations, the first and second selection transistors adjust are configured to the capacitance value to a third capacitance value different from each of the first and second capacitance values, based on the first and second selection control signals.

In some implementations, the first and second selection transistors are disposed to face the driving transistor and the reset transistor, based on a pixel region.

In some implementations, the control circuit comprises a plurality of selection transistors configured to generate the plurality of selection control signals, respectively.

In some implementations, the capacitance value is adjusted based on a number of selection transistors enabled among the plurality of selection transistors.

BRIEF DESCRIPTION OF THE DRAWINGS

FIG. 4 illustrates the waveforms of first and second selection control signals of FIG. 3.

DETAILED DESCRIPTION

The advantages and characteristics of the disclosed technology and a method for achieving the advantages and characteristics will be discussed below with reference to the accompanying drawings.

The disclosed technology can be implemented in some embodiments to provide an image sensing device that can adjust the capacitance of a floating diffusion node, and an operation method thereof.

In some embodiments of the disclosed technology, the image sensing device may adjust a conversion gain ratio by adjusting the capacitance value of the floating diffusion node.

In some implementations, a CMOS image sensing device includes a large number of imaging pixels, each of which includes a photo diode, a reset transistor, a transmission transistor, a conversion gain transistor, a driving transistor and a selection transistor.

Figure 1:
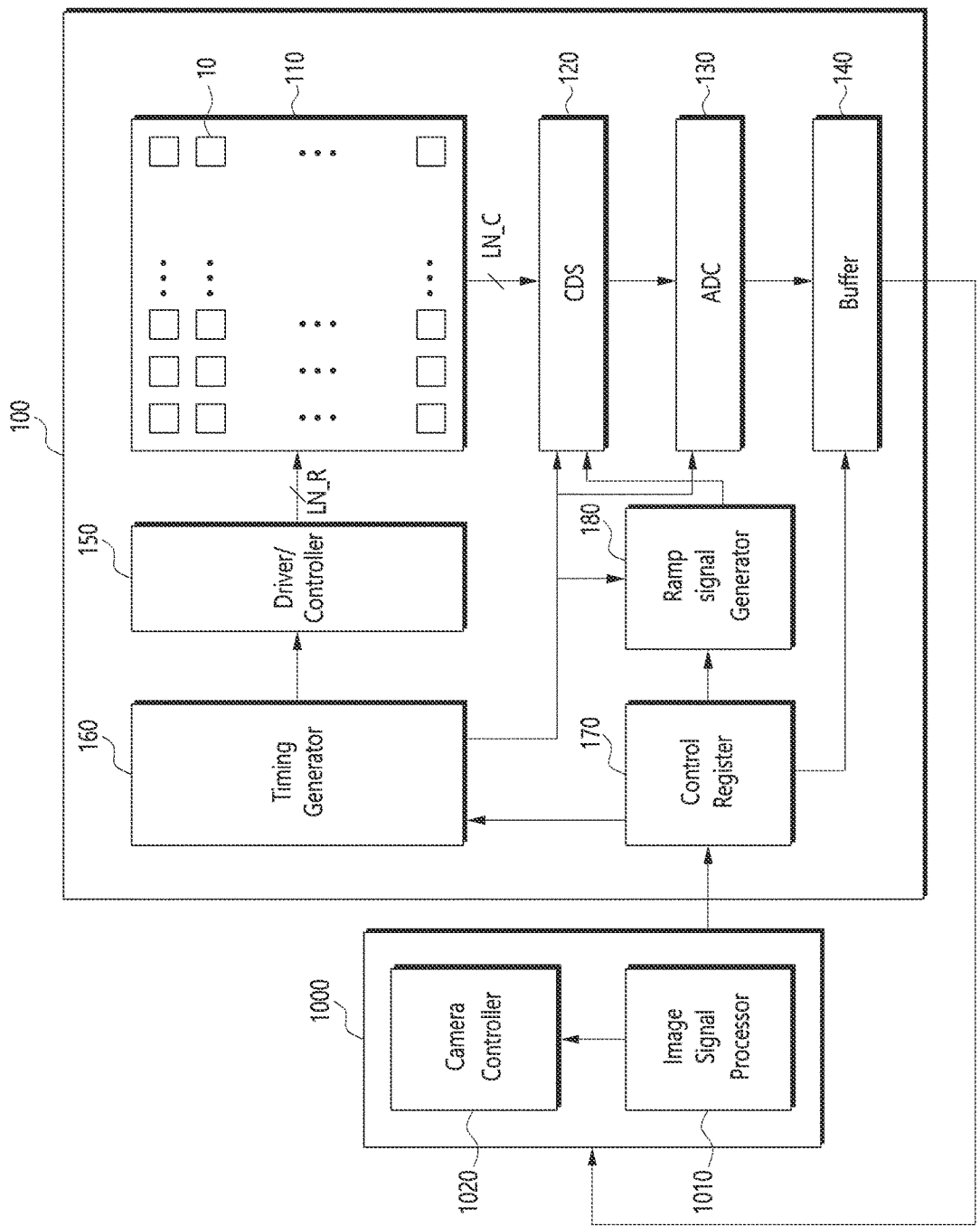
FIG. 1 is a block diagram illustrating an example configuration of an image sensing device based on some embodiments of the disclosed technology.

FIG. 1 is a block diagram illustrating an example configuration of an image sensing device 100 and an image processor 1000 based on some embodiments of the disclosed technology.

Referring to FIG. 1, the image sensing device 100 may be configured to capture incident light carrying an image using a lens or a lens module (not illustrated). In some implementations, the image processor 1000 may control the operations of the image sensing device 100. The image processor 1000 may also be configured to process image data provided by the image sensing device 100.

The image sensing device 100 may include a pixel array 110, a correlated double sampler (CDS) 120, an analog-digital converter (ADC) 130, a buffer 140, a driver/controller 150, a timing generator 160, a control register 170 and a ramp signal generator 180. The pixel array 110 may include a plurality of pixels 10 arranged in rows and columns in an array. Although FIG. 1 illustrates the image sensing device 100 as including the components discussed above by way of example, additional components may be added and some of the components may be omitted in other implementations.

The pixel array 110 may include the plurality of pixels 10 arranged in rows and columns. Each of the pixels 10 may convert incident light carrying optical images into electrical signals representing the optical images, and transmit the electrical signals to the CDS 120. The pixel array 110 includes photoelectric conversion elements. For example, each of the plurality of pixels may include a photoelectric conversion element, so the pixel array 110 may capture incident light and convert the captured light into electrical signals.

In some implementations, the image sensing device 100 may use the CDS 120 to remove an undesired offset value of pixels by sampling a pixel signal twice to remove the difference between these two samples. In one example, the CDS 120 may remove the undesired offset value of pixels by comparing pixel output voltages obtained before and after a light signal is incident on the pixels so that only pixel output voltages based on the incident light can be measured. In some embodiments of the disclosed technology. In some implementations, the CDS 120 may sample the electrical signals representing the images (hereinafter "electrical image signals") captured by and received from the plurality of pixels 10 of the pixel array 110. The CDS 120 may sample the electrical image signals on the basis of a timing control signal provided from the timing generator 160. The CDS 120 may generate analog values corresponding to the differences between two electrical image signals, and output the generated analog values.

The ADC 130 may convert analog signals to digital signals. For example, the ADC 130 may convert analog CDS signals to digital signals. Examples of the ADC 130 may include a ramp-compare type ADC where the analog signal is compared with a reference signal such as a ramp signal that ramps up or down and a timer counts until a voltage of the ramp signal matches the analog signal. In some embodiments of the disclosed technology, the ADC 130 may compare voltage levels corresponding to the electrical image signals with a voltage level corresponding to a ramp voltage signal provided by the ramp signal generator 180. In one example, the ADC 130 may convert the analog values generated by the CDS 120 into digital values by comparing the analog values generated by the CDS 120 with the ramp voltage signal. The digital value may be provided to the buffer 140.

The buffer 140 may hold or "latch" the digital values outputted from the ADC 130, and sequentially transfer the latched digital values to the image processor 1000. The buffer 140 may include a plurality of latch circuits (not illustrated) for holding the digital values and a sense amplifier (not illustrated) for amplifying the digital values.

The driver/controller 150 may selectively activate the plurality of pixels 10 of the pixel array 110 based on the timing control signal provided by the timing generator 160. For example, the driver/controller 150 may select one or more row lines LN_R of a plurality of row lines LN_R, and generate various control signals for activating one or more pixels out of the plurality of pixels 10. In some implementations, the various control signals may include a reset control signal, a transmission control signal and others. The driver/controller 150 may generate a plurality of selection control signals to output image data, stored in the plurality of pixels 10, through a plurality of column lines LN_C. The reset control signal, the transmission control signal and the plurality of selection control signals will be discussed below with reference to FIGS. 2 to 4.

The timing generator 160 may generate the timing control signal for controlling the CDS 120, an ADC 130, the driver/controller 150 and the ramp signal generator 180. The control register 170 may generate a control signal for controlling the buffer 140, the timing generator 160 and the ramp signal generator 180/ In some implementations, the image processor 1000 may control the operations of the control register 170. The ramp signal generator 180 may generate a ramp voltage signal and provide the generated ramp voltage signal to the CDS 120. In some implementations, the timing generator 160 and the control register 170 may control the operations of the ramp signal generator 180.

The image processor 1000 may include an image signal processor 1010 and a camera controller 1020.

The image signal processor 1010 may generate a control signal for controlling the image sensing device 100, and process the digital values provided by the image sensing device 100. In some implementations, the image signal processor 1010 may receive the digital values obtained by converting the captured image and representing an image, and process the received digital values to display the image. The camera controller 1020 may control the operations of the control register 170 of the image sensing device 100 using an I2C (Inter-Integrated Circuit).

Figure 2:
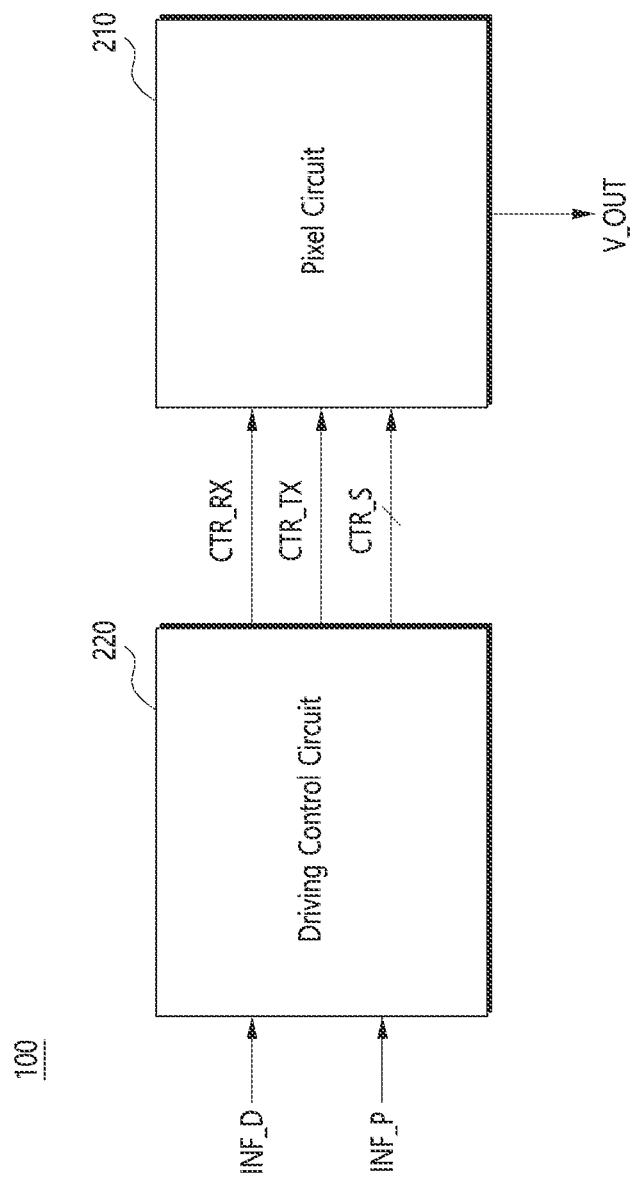
FIG. 2 is a block diagram illustrating some components of the image sensing device based on some embodiments of the disclosed technology.

FIG. 2 is a block diagram illustrating some components of the image sensing device 100 based on some embodiments of the disclosed technology.

Referring to FIG. 2, the image sensing device 100 may include a pixel circuit 210 and a driving control circuit 220. The pixel circuit 210 may correspond to the pixel 10 of FIG. 1, and the driving control circuit 220 may correspond to the driver/controller 150 of FIG. 1.

Figure 3:
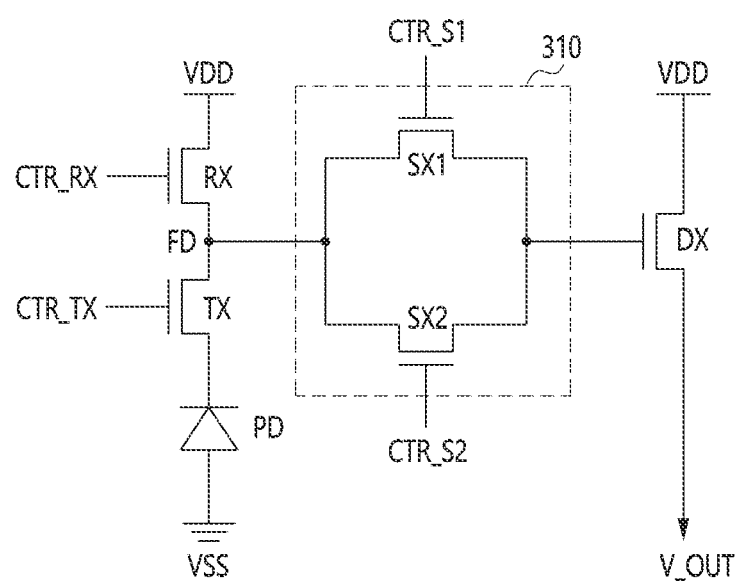
FIG. 3 is a circuit diagram illustrating an example configuration of a pixel circuit of FIG. 2.

In some implementations, the pixel circuit 210 may be configured to transfer, to a floating diffusion node (see FIG. 3), photocharge generated by a photoelectric conversion element (see FIG. 3). The pixel circuit 210 will be described in more detail below with reference to FIG. 3. The pixel circuit 210 may include circuitry that can adjust the capacitance value of the floating diffusion node on the basis of a plurality of selection control signals CTR_S.

The driving control circuit 220 may be configured to generate a reset control signal CTR_RX and a transmission control signal CTR_TX to control a row operation of the pixel circuit 210. The driving control circuit 220 may be configured to generate a plurality of selection control signals CTR_S to control a column operation of the pixel circuit 210. The plurality of selection control signals CTR_S may include two or more selection control signals CTR_S.

In some implementations, the driving control circuit 220 may control the row operation and the column operation on the pixel circuit 210. The row operation may include an operation for selecting the plurality of row lines LN_R of the pixel circuit 210 discussed above with reference to FIG. 1. The column operation may include an operation for selecting the plurality of column lines LN_C of the pixel circuit 210 discussed above with reference to FIG. 1. As will be described below, the driving control circuit 220 may generate the reset control signal CTR_RX and the transmission control signal CTR_TX in order to control the row operation on the pixel circuit 210. The driving control circuit 220 may generate a plurality of selection control signals CTR_S to control the column operation on the pixel circuit 210.

The image sensing device 100 based on some embodiments of the disclosed technology may adjust the conversion gain of the image sensing device 100 by controlling or adjusting the capacitance value of the floating diffusion node of the pixel circuit 210 on the basis of the plurality of selection control signals CTR_S generated by the driving control circuit 220 during a column operation.

FIG. 3 is a circuit diagram illustrating an example configuration of the pixel circuit 210 of FIG. 2.

Referring to FIG. 3, the pixel circuit 210 may include a reset transistor RX, a transmission transistor TX, a control circuit 310 and a driving transistor DX. In some implementations, the pixel circuit 210 may also include a photoelectric conversion element PD.

The reset transistor RX may be configured to reset the floating diffusion node FD on the basis of the reset control signal CTR_RX. The reset transistor RX may be coupled between a power supply voltage terminal VDD and the floating diffusion node FD. The reset transistor RX may be turned on/off on the basis of the reset control signal CTR_RX. In some implementations, the floating diffusion node FD is "reset" by connecting the floating diffusion node FD to the power supply voltage terminal VDD. Therefore, when the reset transistor RX is turned on, the floating diffusion node FD may be charged and "reset" by the supply voltage terminal VDD. In this patent document, a "reset operation" includes charging the floating diffusion node FD.

The transmission transistor TX may be configured to transmit photocharge generated by the photoelectric conversion element PD, to the floating diffusion node FD on the basis of the transmission control signal CTR_TX. The transmission transistor TX may be coupled between the floating diffusion node FD and a ground voltage terminal VSS. The transmission transistor TX may be turned on or off on the basis of the transmission control signal CTR_TX. Therefore, when the transmission transistor TX is turned on, the photocharge generated by the photoelectric conversion element PD may be transferred to the floating diffusion node FD. In this patent document, a "transmission operation" includes transferring photocharge to the floating diffusion node FD.

The floating diffusion node FD may have a voltage level corresponding to the photocharge generated by the photoelectric conversion element PD and transferred through the reset operation and the transmission operation. When the floating diffusion node FD is charged with the photocharge, and the voltage at the floating diffusion node FD increases. The voltage at the floating diffusion node FD decreases when the reset operation is performed. Here, the voltage drop may vary depending on the amount of photocharge transferred to the floating diffusion node FD. For example, when a large amount of photocharge is transferred, the voltage drop at the floating diffusion node FD may be small compared to when a smaller amount of photocharge is transferred. That is, when a large amount of photocharge is transferred, the voltage level of the floating diffusion node FD may be at a higher level than when a small amount of photocharge is transferred. For example, when a small amount of photocharge is transferred, the voltage drop at the floating diffusion node FD may be large. That is, when a small amount of photocharge is transferred, the voltage level of the floating diffusion node FD may be at a lower level than when a large amount of photocharge is transferred.

As described above, the reset control signal CTR_RX and the transmission control signal CTR_TX may be generated during a row operation on the pixel circuit 210. Therefore, the row operation may include the reset operation corresponding to the reset control signal CTR_RX and the transmission operation corresponding to the transmission control signal CTR_TX. In other words, the image sensing device 100 may transfer photocharge to the floating diffusion node FD through the reset operation and the transmission operation which are performed during the row operation.

The disclosed technology can be implemented in some embodiments to provide a control circuit coupled between a floating diffusion node (FD) and a source follower transistor (driving transistor DX) to adjust the conversion gain of a photoelectric conversion element (e.g., a photodetector PD). In some implementations, the control circuit 310 may be configured to control or adjust the capacitance value of the floating diffusion node FD on the basis of a plurality of selection control signals (e.g., CTR_S1 and CTR_S2). For example, the control circuit 310 may control or adjust the capacitance value of the floating diffusion node FD based on a first selection control signal CTR_S1 and a second selection control signal CTR_S2. Although FIG. 3 illustrates the control circuit 310 as receiving two selection control signals by way of example, more than two selection control signals can be used in other implementations.

In some implementations, the control circuit 310 may include first and second selection transistors SX1 and SX2 corresponding to the first and second selection control signals CTR_S1 and CTR_S2, respectively. In other implementations, the control circuit 310 may include more than two selection transistors.

The first selection transistor SX1 may be configured to adjust the capacitance value of the floating diffusion node FD to a first capacitance value on the basis of the first selection control signal CTR_S1. In some implementations of the disclosed technology, the first selection transistor SX1 is coupled between the floating diffusion node FD and the driving transistor DX. The first selection transistor SX1 may be turned on or off on the basis of the first selection control signal CTR_S1. When the first selection transistor SX1 is turned on, the capacitance value of the floating diffusion node FD may be adjusted to the first capacitance value by activating and connecting the first selection transistor SX1 to the floating diffusion node FD. When the first selection transistor SX1 is turned on and enabled, the capacitance value of the floating diffusion node FD is determined based on the capacitance of the floating diffusion node FD and the capacitance of the first selection transistor SX1 (and other selection transistors activated and coupled to the floating diffusion node FD), and thus the voltage level of the floating diffusion node FD, which is transmitted to the driving transistor DX, may be determined based on the capacitance of the floating diffusion node FD and the capacitance of the first selection transistor SX1 (and other selection transistors activated and coupled to the floating diffusion node FD).

The second selection transistor SX2 may be configured to adjust the capacitance value of the floating diffusion node FD to a second capacitance value on the basis of the second selection control signal CTR_S2. In some implementations of the disclosed technology, the second selection transistor SX2 is coupled between the floating diffusion node FD and the driving transistor DX. In one example, the first selection transistor SX1 and the second selection transistor SX2 are coupled in parallel between the floating diffusion node FD and the driving transistor DX, The second selection transistor SX2 may be turned on or off on the basis of the second selection control signal CTR_S2. When the second selection transistor SX2 is turned on, the capacitance value of the floating diffusion node FD may be adjusted to the second capacitance value by activating and connecting the second selection transistor SX2 to the floating diffusion node FD. When the second selection transistor SX2 is turned on and enabled, the capacitance value of the floating diffusion node FD is determined based the capacitance of the floating diffusion node FD and the capacitance of the second selection transistor SX2 (and other selection transistors activated and coupled to the floating diffusion node FD), and thus the voltage level of the floating diffusion node FD, which is transferred to the driving transistor DX, may be determined based on the capacitance of the floating diffusion node FD and the capacitance of the second selection transistor SX2 (and other selection transistors activated and coupled to the floating diffusion node FD).

The first and second capacitance values may be different from each other. There are many factors that affect the capacitance value. For example, the channel length and width of the transistor, the thickness of a gate dielectric layer and the impurity doping concentration of the channel region of the transistor can affect the capacitance value. Therefore, the first selection transistor SX1 may be different from the second selection transistor SX2 in terms of at least one of the factors discussed above, and thus the capacitance value of the first selection transistor SX1 and the capacitance value of the second selection transistor SX2 may be different from each other. That is, the first capacitance value adjusted from the original capacitance value of the floating diffusion node FD by activating and connecting the first selection transistor SX1 and the second capacitance value adjusted from the original capacitance value of the floating diffusion node FD by activating and connecting the second selection transistor SX2 may be different from each other.

As will be described in more detail with reference to FIG. 4, both the first and second selection transistors SX1 and SX2 may be turned on according to the operation of the driving control circuit 220 (see FIG. 2). At this time, the capacitance value of the floating diffusion node FD is determined based on the capacitance of the floating diffusion node FD and the capacitance values of the first and second selection transistors SX1 and SX2. As such, the capacitance value of the floating diffusion node FD may be adjusted to a third capacitance value by reflecting the capacitance values of the first and second selection transistors SX1 and SX2. As a result, depending on which of the first selection transistor SX1 and the second selection transistor SX2 is activated and whether both the he first and second selection transistors SX1 and SX2 are activated, the capacitance value of the floating diffusion node FD may be controlled to have one of the first to third capacitance values. In this patent document, a "capacitance control operation" includes controlling the capacitance value of the floating diffusion node FD.

The driving transistor DX may be configured to generate an output voltage V_OUT corresponding to the voltage level of the floating diffusion node FD. The driving transistor DX may have one terminal coupled to the supply voltage terminal VDD and a gate terminal coupled to the first and second selection transistors SX1 and SX2. The driving transistor DX may receive a voltage of the floating diffusion node FD, the level of which is controlled or adjusted by at least one of the first selection transistor SX1 or the second selection transistor SX2, through the gate terminal. In some implementations, the driving transistor DX may operate as a source follower circuit or a common-drain amplifier. Therefore, an increase or a decrease in the voltage level of the input voltage to the gate terminal of the driving transistor DX can increase or decrease the conducting channel of the driving transistor DX, and thus the output voltage V_OUT generated by the driving transistor DX increases or decreases based on the input voltage to the gate terminal of the driving transistor DX. In this patent document, a "driving operation" includes activating the driving transistor DX to generate the output voltage V_OUT.

As described above, the plurality of selection control signals, such as the first and second selection control signals CTR_S1 and CTR_S2, may be operated during a column operation. Therefore, the column operation may include a capacitance control operation and a select output operation, which correspond to the first and second selection control signals CTR_S1 and CTR_S2, and a driving operation corresponding to the driving transistor DX. In other words, the image sensing device 100 may transfer the voltage level of the floating diffusion node FD to the driving transistor DX through the capacitance control operation and the select output operation, which are performed during the column operation. Furthermore, the image sensing device 100 may generate the output voltage V_OUT through a driving operation performed during the column operation.

FIG. 4 illustrates the waveforms of the first and second selection control signals CTR_S1 and CTR_2 of FIG. 3. FIG. 4 illustrates waveforms corresponding to the reset control signal CTR_RX, the transmission control signal CTR_TX, the first selection control signal CTR_S1 and the second selection control signal CTR_S2.

Referring to FIGS. 3 and 4, the pixel circuit 210 may perform a reset operation when the reset control signal CTR_RX is activated from a logic 'low' level to a logic 'high' level. Then, the pixel circuit 210 may perform a transmission operation when the transmission control signal CTR_TX is activated from a logic 'high' level to a logic 'low' level.

The operation state of the image sensing device 100 based on some embodiments of the disclosed technology may be divided into three operation modes depending on which of the first and second selection control signals CTR_S1 and CTR_S2 is activated.

In a first mode (A), only the first selection control signal CTR_S1 is activated from a logic 'low' level to a logic 'high' level. When the first selection control signal CTR_S1 is activated, the first selection transistor SX1 may be enabled. Therefore, the capacitance value of the floating diffusion node FD is modified from its original capacitance value to the first capacitance value by reflecting the capacitance value of the first selection transistor SX1.

In a second mode (B), only the second selection control signal CTR_S2 is activated. When the second selection control signal CTR_S2 is activated, the second selection transistor SX2 may be enabled. Therefore, the capacitance value of the floating diffusion node FD is modified from its original capacitance value to the second capacitance value by reflecting the capacitance value of the second selection transistor SX2.

In a third mode (C), both of the first and second selection control signals CTR_S1 and CTR_S2 are activated. When the first and second selection control signals CTR_S1 and CTR_S2 are both activated, the first and second selection transistors SX1 and SX2 may be enabled. Therefore, the capacitance value of the floating diffusion node FD is modified from its original capacitance value to the third capacitance value by reflecting the capacitance values of the first and second selection transistors SX1 and SX2.

The image sensing device 100 based on some embodiments of the disclosed technology may tune the capacitance value of the floating diffusion node FD to control the conversion gain of the image sensing device 100. The capacitance value of the floating diffusion node FD can have one of a plurality of capacitance values (e.g., the first to third capacitance values discussed above) depending on the operation state thereof. Therefore, the image sensing device 100 may have various conversion gain ratios with respect to the pixel circuit 210.

Referring back to FIG. 2, the driving control circuit 220 may selectively activate the plurality of selection control signals CTR_S on the basis of driving information INF_D and illuminance information INF_P, during the column operation. The driving information INF_D may include information that will be used to activate the corresponding column line among the plurality of column lines LN_C (see FIG. 1). The illuminance information INF_P may include information on the illuminance of a captured image. Thus, the driving control circuit 220 may determine whether to activate the plurality of selection control signals CTR_S on the basis of the driving information INF_D. Furthermore, the driving control circuit 220 may select one or more selection control signals to be activated, among the plurality of selection control signals CTR_S, on the basis of the illuminance information INF_P.

In some implementations, the driving control circuit 220 may determine whether and in which mode the plurality of selection control signals CTR_S is activated, e.g., modes (A), (B) and (C), on the basis of the driving information INF_D. The driving control circuit 220 may select one of the plurality of mode, e.g., mode (A), (B) or (C), on the basis of the illuminance information INF_P. For example, when the image is captured under a high illuminance condition, a low illuminance condition or an intermediate illuminance condition, the driving control circuit 220 may select one of the mode (A), (B) and (C) based on the illuminance condition of the captured image. For example, the capacitance value of the floating diffusion node FD may decrease in response to the illuminance information INF_P corresponding to the high illuminance condition. Furthermore, the capacitance value of the floating diffusion node FD may increase based on the illuminance information INF_P corresponding to the low illuminance condition. That is, the capacitance value may be inversely proportional to the illuminance information.

The image sensing device 100 based on some embodiments of the disclosed technology may control the capacitance value of the floating diffusion node FD based on the illuminance condition of the captured image. The image sensing device 100 may adjust the capacitance value of the floating diffusion node FD, thereby utilizing various conversion gain ratios in converting incident light to electrical signals.

Referring back to FIG. 1, in some implementations, each of the pixels 10 may a unit pixel. In other implementations, each of the pixels 10 may a group of unit pixels. In one example, an 8-shared pixel structure that includes eight unit pixels will be discussed below as an example. The disclosed technology can also be implemented in some embodiment to provide pixels 10 with a 4-shared pixel structure that includes four unit pixels in each group or a 2-shared pixel structure that includes two unit pixels in each group. Furthermore, the disclosed technology can also be implemented in some embodiment to provide pixels 10 that do not have a shared pixel structure.

Figure 5:
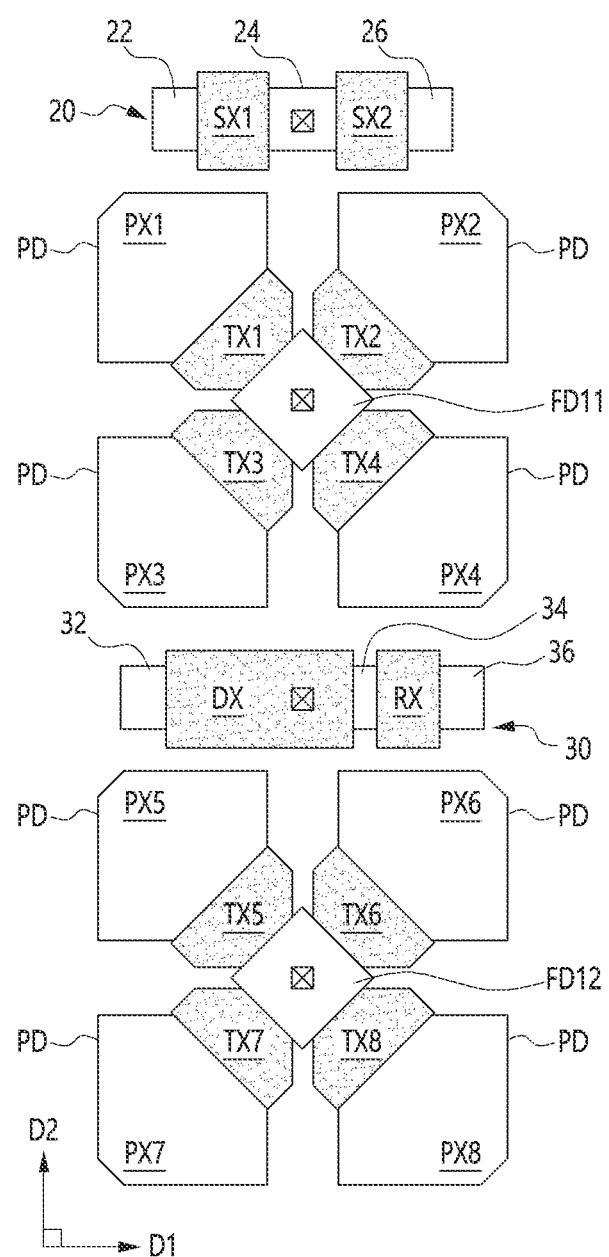
FIG. 5 is a plan view illustrating an example of a pixel array of FIG. 1.

FIG. 5 is a plan view illustrating an example of the pixel array 110 of FIG. 1. In one example, the pixel array 110 includes eight unit pixels. Furthermore, first and second directions D1 and D2 may indicate directions crossing each other. For example, in an XY coordinate system, the first direction D1 may correspond to an X-axis direction, and the second direction D2 may correspond to a Y-axis direction.

As illustrated in FIG. 5, the pixel array 110 may include first to eighth unit pixels PX1 to PX8 arranged in rows and columns in a matrix array. The first to eight unit pixels PX1 to PX8 may be arranged in a 2×4 matrix array. The first to fourth unit pixels PX1 to PX4 may be radially arranged around a first sub floating diffusion node FD11, while sharing the first sub floating diffusion node FD11. Similarly, the fifth to eighth unit pixels PX5 to PX8 may be radially arranged around a second sub floating diffusion node FD12, while sharing the second sub floating diffusion node FD12. The first and second sub floating diffusion nodes FD11 and FD12 may be aligned with each other in the second direction D2. The first and second sub floating diffusion nodes FD11 and FD12 may be electrically coupled to each other through a contact plug and an interconnect structured to couple the first and second sub floating diffusion nodes FD11 and FD12 to each other (not illustrated).

Each of the first to eighth unit pixels PX1 to PX8 may include a photoelectric conversion element PD. The photoelectric conversion element PD may include a photo diode, a photo transistor, a photo gate, a PPD (Pinned Photo Diode) or a combination thereof. For example, the photoelectric conversion element PD may be a photo diode. The photo diode may include a structure in which an N-type impurity region and a P-type impurity region are stacked in a vertical direction.

The first to eighth unit pixels PX1 to PX8 may include first to eighth transmission transistors TX1 to TX8, respectively. Photocharge generated by the photoelectric conversion element PD in response to incident light may be transferred to the first and second sub floating diffusion nodes FD11 and FD12 through first to eighth transmission transistors TX1 to TX8.

The first and second selection transistors SX1 and SX2 may be disposed on one side of the first and second unit pixels PX1 and PX2. For example, the first selection transistor SX1 may be disposed at the top of the first unit pixel PX1 in the second direction D2, and the second selection transistor SX2 may be disposed at the top of the second unit pixel PX2 in the second direction D2. For reference, the positions of the first and second selection transistors SX1 and SX2 may vary.

The first and second selection transistors SX1 and SX2 may share a first active region 20. The first active region 20 may have a bar-type planar shape extending in the first direction D1. Although not illustrated in the drawing, a well tap may be located adjacent to either end of the first active region 20 or both ends thereof.

The first active region 20 may include first to third junction regions 22, 24 and 26, and the first to third junction regions 22, 24 and 26 may be used as source and drain terminals of the first and second selection transistors SX1 and SX2. For example, the first junction region 22 may be used as the source terminal of the first selection transistor SX1, and the third junction region 26 may be used as the drain terminal of the second selection transistor SX2. The second junction region 24 may be used as the drain terminal of the first selection transistor SX1 and the source terminal of the second selection transistor SX2. As described above, in terms of at least one of the channel length and width of the transistor, the thickness of a gate dielectric layer of the transistor, and the impurity doping concentration of a channel region of the transistor, the first selection transistor SX1 may be different from the second selection transistor SX2. Therefore, the first and second selection transistors SX1 and SX2 may have different capacitance values.

In some implementations, the driving transistor DX and the reset transistor RX may be disposed between the third and fourth unit pixels PX3 and PX4 and the fifth and sixth unit pixels PX5 and PX6. For example, the driving transistor DX may be located between the third unit pixel PX3 and the fifth unit pixel PX5, and the reset transistor RX may be disposed between the fourth unit pixel PX4 and the sixth unit pixel PX6. For reference, the positions of the driving transistor DX and the reset transistor RX may vary.

The driving transistor DX and the reset transistor RX may share a second active region 30. The second active region 30 may have a bar-type planar shape extending in the first direction D1. Although not illustrated in the drawing, a well tap may be located adjacent to either end of the second active region 30 or both ends thereof.

The second active region 30 may include fourth to sixth junction regions 32, 34 and 36, and the fourth to sixth junction regions 32, 34 and 36 may be used as source and drain terminals of the driving transistor DX and the reset transistor RX. For example, the fourth junction region 32 may be used as the drain terminal of the driving transistor DX, and the sixth junction region 36 may be used as the source terminal of the reset transistor RX. The fifth junction region 34 may be used as the source terminal of the driving transistor DX and the drain terminal of the reset transistor RX.

As illustrated in FIG. 5, the first and second selection transistors SX1 and SX2 may be disposed to face the driving transistor DX and the reset transistor RX, based on a pixel region. The pixel region may include a region in which the first to fourth unit pixels PX1 to PX4 are disposed.

Figure 6:
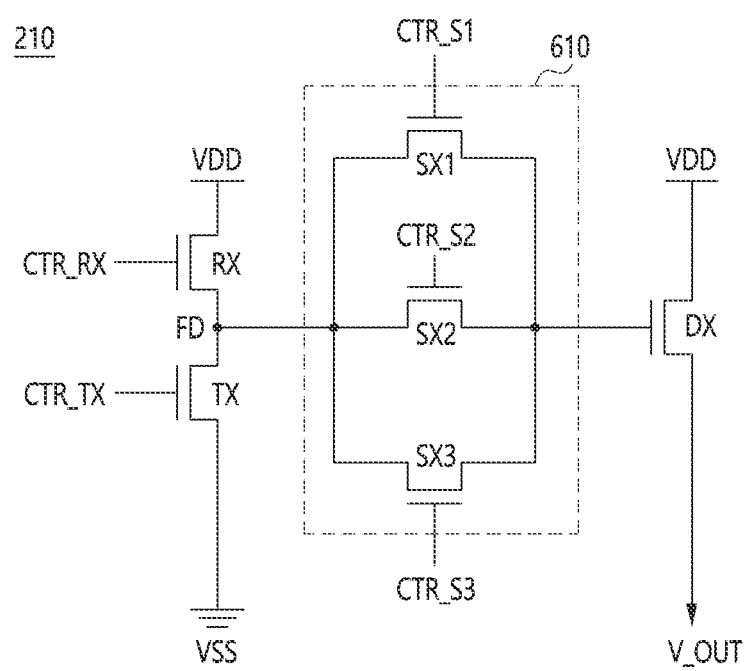
FIG. 6 is a circuit diagram illustrating another example configuration of the pixel circuit of FIG. 2.

FIG. 6 is a circuit diagram illustrating another example configuration of the pixel circuit 210 of FIG. 2.

Referring to FIG. 6, the pixel circuit 210 may include a reset transistor RX, a transmission transistor TX, a control circuit 610 and a driving transistor DX. The pixel circuit 210 of FIG. 6 the control circuit 610 which is different from that of the pixel circuit 210 of FIG. 3. In some implementations, the components other than the control circuit 610 may be identical or similar to what is discussed above with reference to FIG. 3.

The control circuit 610 may be configured to adjust the capacitance value of the floating diffusion node FD on the basis of a plurality of selection control signals CTR_S1 to CTR_S3. The control circuit 610 may include first to third selection transistors SX1 to SX3 corresponding to the plurality of selection control signals, such as first to third selection control signals CTR_S1 to CTR_S3, respectively. Although FIG. 6 illustrates the control circuit 610 as including three selection transistors, i.e., the first to third selection transistors SX1 to SX3 by way of example, the control circuit 610 may include three or more selection transistors in other implementations. Furthermore, the control circuit 610 may include variable transistors controlled in an analog type instead of or in addition to the first to third selection transistors SX1 to SX3. When the control circuit 610 includes variable transistors, the capacitance value of the floating diffusion node FD may be controlled in an analog type.

The first selection transistor SX1 may be enabled or disabled on the basis of the first selection control signal CTR_S1. The second selection transistor SX2 may be enabled or disabled on the basis of the second selection control signal CTR_S2. The third selection transistor SX3 may be enabled or disabled on the basis of the third selection control signal CTR_S3.

In some implementations, the first and second selection transistors SX1 and SX2 of the control circuit 310 of FIG. 3 may have different capacitance values. In some implementations, the first to third selection transistors SX1 to SX3 of the control circuit 610 of FIG. 6 may have different capacitance values. In some implementations, two or more selection transistors of a plurality of selection transistors have the same capacitance value and the other selection transistors have different capacitance value.

In some implementations, the control circuit 310 of FIG. 3 may selectively enable the first and second selection transistors SX1 and SX2 in order to control the capacitance value of the floating diffusion node FD. In some implementations, the control circuit 610 of FIG. 6 may selectively control the number of selection transistors enabled among the first to third selection transistors SX1 to SX3 for controlling the capacitance value of the floating diffusion node FD.

The first to third selection control signals CTR_S1 to CTR_S3 may be activated on the basis of the driving information INF_D and the illuminance information INF_P, like the first and second selection control signals CTR_S1 and CTR_S2 of FIG. 2. Here, the number of selection control signals activated on the basis of the illumination information INF_P, among the first to third selection control signals CTR_S1 to CTR_S3, may be controlled. In other words, among the first to third selection transistors SX1 to SX3 which are configured to be enabled on the basis of the first to third selection control signals CTR_S1 to CTR_S3, the number of selection transistors enabled on the basis of the illumination information INF_P may vary.

More specifically, one, two or all of the first to third selection transistors SX1 to SX3 may be enabled on the basis of the illuminance information INF_P. The capacitance value of the floating diffusion node FD may vary depending on whether: (1) one of the first to third selection transistors SX1 to SX3 is enabled; (2) two of the first to third selection transistors SX1 to SX3 are enabled; and (3) all of the first to third selection transistors SX1 to SX3 are enabled. Therefore, the control circuit 610 may control the capacitance value of the floating diffusion node FD on the basis of the illumination information INF_P. The control circuit 610 may control the capacitance value of the floating diffusion node FD based on the number of selection transistors enabled among the first to third selection transistors SX1 to SX3.

Figure 7:
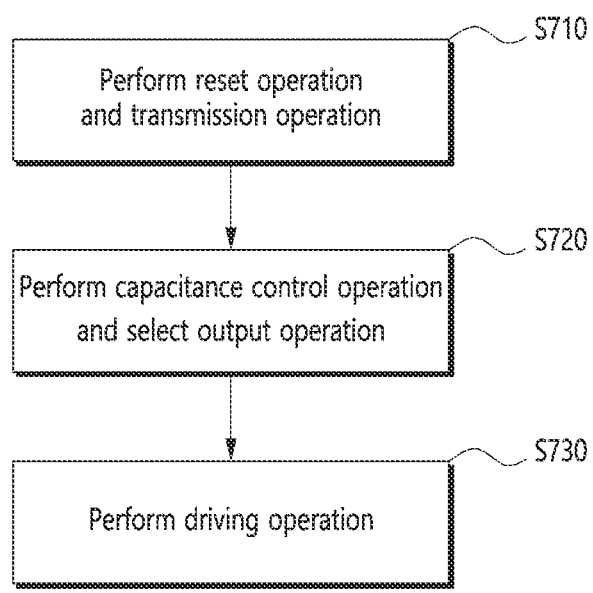
FIG. 7 is a flowchart illustrating example operations of the image sensing device of FIG. 1.

FIG. 7 is a flowchart illustrating example operations of the image sensing device 100 of FIG. 1.

Referring to FIGS. 1 to 3 and 7, the operation method of the image sensing device 100 may include, at S710, performing a reset operation and a transmission operation, at S720, performing a capacitance control operation and a select output operation, and at S730, performing a driving operation.

First, at S710, performing the reset operation and the transmission operation may include resetting the floating diffusion node FD included in the pixel circuit 210 of FIG. 2. The reset operation may be performed by the driving control circuit 220 of FIG. 2, which generates the reset control signal CTR_RX, and the reset transistor RX of FIG. 3, which is enabled on the basis of the reset control signal CTR_RX. Furthermore, at S710, performing the reset operation and the transmission operation may include transmitting photocharge, generated by the photoelectric conversion element PD, to the floating diffusion node FD. The transmission operation may be performed by the driving control circuit 220 of FIG. 2, which generates the transmission control signal CTR_TX, and the transmission transistor TX of FIG. 3, which is enabled on the basis of the transmission control signal CTR_TX.

At S720, performing the capacitance control operation and the select output operation may include controlling the capacitance value of the floating diffusion node FD. Furthermore, at S720, performing the capacitance control operation and the select output operation may include selecting and outputting the voltage level of the floating diffusion node FD, into which the controlled capacitance value is reflected, to the driving transistor DX of FIG. 3 through the corresponding path. The capacitance control operation and the select output operation may be performed by the control circuit 310 of FIG. 3.

At S730, performing the driving operation may include generating an output voltage V_OUT through the driving operation on the basis of the voltage of the floating diffusion node FD. The driving operation may be performed by the driving transistor DX of FIG. 3.

The image sensing device 100 based on some embodiments of the disclosed technology may control the capacitance value of the floating diffusion node FD. Therefore, by controlling the capacitance value, the image sensing device 100 may secure various conversion gain ratios.

Only limited examples of implementations or embodiments of the disclosed technology are described or illustrated. Variations and enhancements for the disclosed implementations or embodiments and other implementations or embodiments are possible based on what is disclosed and illustrated in this patent document.

What is claimed is:

1. An image sensing device comprising:
a pixel circuit configured to transmit, to a floating diffusion node, photocharge generated by a photoelectric conversion element and store image information; and
a driving control circuit configured to generate a reset control signal and a transmission control signal, which are used to control a row operation of the pixel circuit, and generate a plurality of selection control signals to control a column operation of the pixel circuit,
wherein the pixel circuit comprises a driving transistor configured to generate an output voltage corresponding to a voltage level of the floating diffusion node, and a control circuit connected between the floating diffusion node and the driving transistor and configured to control a capacitance value of the floating diffusion node based on the plurality of selection control signals.

2. The image sensing device according to claim 1, wherein the row operation comprises a reset operation and a transmission operation of the pixel circuit, and the column operation comprises a capacitance control operation, a select output operation and a driving operation of the pixel circuit.

3. The image sensing device according to claim 1, wherein the driving control circuit selectively activates the plurality of selection control signals based on driving information and illuminance information during the column operation.

4. The image sensing device according to claim 1, wherein the pixel circuit further comprises:
 a reset transistor configured to reset the floating diffusion node based on the reset control signal; and
 a transmission transistor configured to transmit the photocharge, generated by the photoelectric conversion element, to the floating diffusion node based on the transmission control signal.

5. The image sensing device according to claim 4, wherein the control circuit comprises a plurality of selection transistors configured to generate the plurality of selection control signals, respectively,
 wherein the capacitance value is adjusted based on a number of selection transistors enabled among the plurality of selection transistors.

6. The image sensing device according to claim 1, wherein the plurality of selection control signals comprises a first selection control signal and a second selection control signal, and
 wherein the control circuit comprises:
 a first selection transistor configured to adjust the capacitance value to a first capacitance value based on the first selection control signal; and
 a second selection transistor configured to adjust the capacitance value to a second capacitance value based on the second selection control signal.

7. The image sensing device according to claim 6, wherein the first and second selection transistors are coupled to the floating diffusion node in parallel.

8. The image sensing device according to claim 6, wherein at least one of a channel length, a channel width, a thickness of a gate dielectric layer, an impurity doping concentration of a channel region of the first selection transistor is different from a corresponding one of a channel length, a channel width, a thickness of a gate dielectric layer, an impurity doping concentration of a channel region of the second selection transistor.

9. The image sensing device according to claim 6, wherein the first and second selection transistors adjust are configured to the capacitance value to a third capacitance value different from each of the first and second capacitance values, based on the first and second selection control signals.

10. The image sensing device according to claim 6, wherein the first and second selection transistors are disposed to face the driving transistor and the reset transistor, based on a pixel region.

11. An operation method of an image sensing device, comprising:
 resetting a floating diffusion node included in a pixel circuit of the image sensing device, wherein the image sensing device includes a photoelectric conversion element to detect incident light to generate photocharge carrying an image in the incident light, and the floating diffusion node holds the photocharge generated by the photoelectric conversion element;
 transmitting, to the floating diffusion node, the photocharge, generated by the photoelectric conversion element;
 selectively activating at least one of a plurality of selection transistors connected between the floating diffusion node and a driving transistor configured to generate an output voltage corresponding to a voltage level of the floating diffusion node to adjust a capacitance value of the floating diffusion node; and
 generating an output voltage based on a voltage of the floating diffusion node adjusted based on the capacitance value of the floating diffusion node.

12. The operation method according to claim 11, wherein the resetting of the floating diffusion node and the transmitting of the photocharge are included in a first operation of the pixel circuit associated with a row of the image sensing device, and the activating of the at least one of the selection transistors and the generating of the output voltage are included in a second operation of the pixel circuit associated with a column of the image sensing device.

13. The operation method according to claim 11, wherein the activating of the at least one of the plurality of selection transistors is selectively performed based on illuminance information.

14. The operation method according to claim 13, wherein the capacitance value is inversely proportional to the illuminance information.

15. The operation method according to claim 11, wherein the selection transistors have different capacitance values.

16. The operation method according to claim 11, wherein the activating of the at least one of the plurality of selection transistors includes adjusting a number of selection transistors enabled among the plurality of selection transistors.

17. An image sensing device comprising:
 a photoelectric conversion element configured to detect incident light to generate photocharge carrying an image in response to the incident light;
 a floating diffusion node coupled to the photoelectric conversion element and configured to receive and hold the photocharge generated by the photoelectric conversion element;
 a driving transistor configured to generate an output voltage corresponding to a voltage level of the floating diffusion node; and
 a plurality of selection transistors connected between the floating diffusion node and the driving transistor, wherein at least one of the plurality of selection transistors is configured to be activated based on an illuminance information of a sensed image.

18. The image sensing device according to claim 17, further comprising:
 a reset transistor configured to reset the floating diffusion node based on a reset control signal;
 a transmission transistor configured to transmit the photocharge, generated by the photoelectric conversion element, to the floating diffusion node based on the transmission control signal.

19. The image sensing device according to claim 18, wherein the plurality of selection transistors includes different capacitance values, respectively.

* * * * *